United States Patent [19]
Krepski et al.

[11] Patent Number: 5,840,106
[45] Date of Patent: Nov. 24, 1998

[54] WATER-BASED PIGMENTED INKS

[75] Inventors: Larry R. Krepski, White Bear Lake; Richard J. Kuo, St. Paul; Prabhakara S. Rao, Maplewood; Terrance P. Smith, Woodbury, all of Minn.

[73] Assignee: Minnesota Mining and Manufacturing Company, St. Paul, Minn.

[21] Appl. No.: 556,336

[22] Filed: Nov. 13, 1995

[51] Int. Cl.$^6$ .................................................. C09D 11/02
[52] U.S. Cl. ........................................ 106/20 R; 106/499
[58] Field of Search ................... 106/20 R, 23 H, 106/499, 506

[56] References Cited

U.S. PATENT DOCUMENTS

| | | | |
|---|---|---|---|
| 4,304,705 | 12/1981 | Heilmann et al. | 260/30.4 N |
| 4,451,619 | 5/1984 | Heilmann et al. | 525/379 |
| 4,485,236 | 11/1984 | Rasmussen et al. | 544/69 |
| 4,597,794 | 7/1986 | Ohta et al. | 106/20 |
| 4,699,843 | 10/1987 | Charbonneau et al. | 428/355 |
| 4,931,582 | 6/1990 | Heilmann et al. | 560/172 |
| 4,988,602 | 1/1991 | Jongewaard et al. | 430/115 |
| 5,081,197 | 1/1992 | Heilmann et al. | 526/260 |
| 5,085,698 | 2/1992 | Ma et al. | 106/20 |
| 5,091,489 | 2/1992 | Heilmann et al. | 526/90 |
| 5,149,806 | 9/1992 | Moren et al. | 544/72 |
| 5,194,623 | 3/1993 | Krepski et al. | 548/261 |
| 5,216,084 | 6/1993 | Francis et al. | 525/385.2 |
| 5,236,741 | 8/1993 | Zwiener et al. | 427/385.5 |
| 5,243,012 | 9/1993 | Wicks et al. | 528/58 |
| 5,268,473 | 12/1993 | Moren et al. | 544/72 |
| 5,284,512 | 2/1994 | Koskan et al. | 106/499 |
| 5,292,514 | 3/1994 | Capecchi et al. | 424/422 |
| 5,310,778 | 5/1994 | Shor et al. | 106/499 |
| 5,336,742 | 8/1994 | Heilmann et al. | 526/260 |
| 5,424,445 | 6/1995 | Maat et al. | 106/499 |
| 5,519,085 | 5/1996 | Ma et al. | 106/499 |

*Primary Examiner*—Helene Klemanski
*Attorney, Agent, or Firm*—Gary G. Griswold; Walter N. Kirn

[57] ABSTRACT

Water-based pigmented inks are disclosed. Such inks are formed from water-based dispersions of pigment particles having novel dispersants therein. The dispersions are formed from the reaction product of an alkenyl azlactone with an N-substituted amino acid compound. Subsequent to the reaction, the reaction product is ring-opened using an amine and, optionally, hydrolyzed. The resulting inks are well-suited for use in ink jet and other printing applications.

32 Claims, No Drawings

WATER-BASED PIGMENTED INKS

FIELD OF THE INVENTION

The present invention relates to water-based pigmented inks, and in particular, such inks adapted for use with ink jet printing applications.

BACKGROUND OF THE INVENTION

In recent years, the use of thermal ink jet printers in numerous applications has increased dramatically. Such printers make use of liquid-based inks which are sprayed onto a receptor, typically a sheet of paper or film, to produce an image. By using four basic ink colors (black, yellow, cyan, and magenta) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic- or water-based carrier liquids. Although such inks may offer satisfactory performance in certain applications, the present trend is away from such systems, since such systems tend to produce images that lack the light stability and durability required for outdoor and similarly demanding applications. Additionally, the use of organic-based carrier liquids creates numerous environmental and material-handling complications. Rather, the printing industry has sought inks which are primarily water-based, to thereby reduce or eliminate the problems associated with organic solvent-based systems.

Initial attempts to form water-based pigmented inks for ink jet applications were less than successful. In one approach, such inks comprised a suspension of pigment particles in a water-based carrier. Unfortunately, the suspended pigments tended to agglomerate. Since ink jet printers make use of very small jet nozzles (on the order of less than about 80 micrometers) to provide high resolution images, the resulting pigment agglomerations had a tendency to restrict or clog the printer heads. This effect is referred to herein as "plugging". Additionally, in the case of thermal ink jet systems, such inks also suffered from the tendency of materials to settle onto, and coat, the heating elements of the printer heads. This causes a decreased thermal efficiency of the print head which results in the formation of smaller ink droplets and lower image quality. This effect is commonly referred to as "kogation".

To overcome the problems described above, some water-based ink jet inks have employed dispersants. In one approach, the dispersants were formed from surfactants which contain a hydrophilic portion as well as a hydrophobic portion. In another approach, copolymers having hydrophilic segments and hydrophobic segments were used. Examples of these approaches are described in the art, for example in U.S. Pat. No. 4,597,794 and U.S. Pat. 5,085,698.

In the approaches described above, the hydrophobic segments of the surfactant or polymer can absorb onto pigments by "hydrophobic" bonding between the dispersant molecule and the organic-based pigments whose surfaces tend to be hydrophobic. This hydrophobic interaction is usually not very strong. As a result, in thermal ink jet systems, when pigment particles collide due to thermal motion, there is a possibility that the dispersant molecules can desorb from the pigment surface, thereby allowing the pigment particles to flocculate. During printing, this can result in plugging of the printer head jet nozzles.

Other attempts involving the use of polymeric dispersants have been attempted as well. For example, water-soluble polymers and particulate polymer dispersions have also been considered, yet these have yielded only partial success. In particular, such systems, although promising, have tended to produce non-uniform printed solid block images. The lack of uniformity in the printed image, which becomes more pronounced with prolonged printing, is caused by incomplete coverage of the receptor surface in the image area. This problem, commonly referred to as "banding" results from progressively smaller projected ink drops over the course of a printing job. This effect is believed to be a result of kogation, caused by deposition of thermal insulating materials on the heating elements within the printing cartridge. As a result, heat transfer efficiency into the ink is reduced, thereby reducing the ability to produce properly sized ink bubbles needed for the printing process. Even if the deposited material is thermally conductive, it may still change the nucleation behavior on the heater surface during heating which also may adversely affect the bubble formation.

In addition, there is some reason to believe that the presence of any residual polymeric material which is not adsorbed on a pigment particle may have a propensity to deposit onto the heater elements when they are intensely heated during the jetting process. It may also be possible that the polymeric dispersant molecules which are adsorbed on pigment particles may increase the adhesion of pigment particles to the heater elements at elevated temperatures. The detrimental effects of deposition of foreign substances on the heater elements, either polymeric dispersant or pigment particles, are kogation and the jetting problems described above.

SUMMARY OF THE INVENTION

In view of the foregoing, a need exists for water-based inks for ink jet applications which reduce the agglomeration or flocculation of pigment particles, and which reduce the deposition of foreign substances on heater elements during the jetting process. A need also exists for inks which offer stability in both short- and long-term regimes.

The present invention addresses such needs in that it relates to water-based pigmented inks that meet the stringent requirements of ink jet and other printing applications. More particularly, the present invention relates to stable, water-based pigmented inks in which an inventive dispersant is incorporated into a water-based pigment dispersion in order to eliminate or reduce the likelihood that the pigment particles will agglomerate. Such inks comprise, generally, an aqueous suspension of a) pigment particles, and b) a dispersant which comprises a reaction product of an alkenyl azlactone with an N-monosubstituted amino acid compound which, subsequent to reaction, has been ring-opened using an amine and hydrolyzed.

More particularly, the inks of the present invention can include a dispersant which is formed from a molecule which may be described broadly as the reaction product of N-monosubstituted (alkylated) aspartic acids. More specifically, the reaction product is a molecule formed from two N-substituted aspartic acid molecules joined at their nitrogen ends by a carbon chain of 2–20 carbons. For example, in one embodiment, two molecules of a dialkyl maleate are reacted with the ends of a diamino alkane to produce a product such as "polyaspartic ester Desmophen™ XP-7059" (available from Bayer Corporation, Pittsburgh, Pa., hereafter "Bayer"). The reaction product is then reacted with vinyl dimethyl azlactone by Michael addition, and azlactone rings of the resulting molecule are subsequently cleaved by reaction with butyl amine, octyl amine, dodecyl amine, or octadecyl amine. After cleaving, the ester groups on the resulting molecule are hydrolyzed to the corresponding carboxylic acid salt. The hydrolysis is carried out using an aqueous hydroxide such as sodium hydroxide, lithium hydroxide, potassium hydroxide, ammonium hydroxide, or the like. The resulting product has applicability as a pigment dispersant in ink jet, and other, printing inks. Furthermore, the product need not be limited to dispersant applications. Rather, it also may be used as a stabilizer or as a surfactant in such inks.

The reaction used to form the dispersants employed in the inks of the present invention is provided below in the section entitled "Dispersant".

Additionally, since the dispersant has a hydrophilic portion which contains at least one anionic carboxylic functional group per molecule, the pigment particles become effectively highly negatively charged. This is believed to prevent particle flocculation due to exceedingly strong repulsive forces between the particles. As discussed above, reduction of particle flocculation is desired because of the high thermal energy generated during jetting, which causes frequent and energetic particle interactions. Reduction of particle flocculation is further desired because it results in inks having increased non-thermal stability and shelf-life.

The inks of the present invention may be used with numerous pigments. In particular, the inventive inks may be provided with black, cyan, yellow, and magenta pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the four colors discussed above. Rather, inks employing any pigment that is compatible with electronic graphic image systems may be used herein.

DESCRIPTION OF THE PREFERRED EMBODIMENTS

Pigment Selection: One important consideration in formulating a set of colored inks for printing color images is the compatibility of the inks with one another. This is important since the inks will be mixed together, or at the very least, contacted with one another, during the printing process when secondary colors are to be generated. When incompatible inks are mixed together, they can coalesce and present a mottled, non-uniform surface, particularly in solid fill areas. This greatly reduces the quality of the resulting printed image. As such, when used in a multi-color printing process (such as a four-color process) it is desirable to formulate each of the various colored inks using compatible, or preferably identical, formulations. Of course, in each of the formulations, the pigment will differ. Unfortunately, however, since the different pigments tend to have different surface properties, it is often very difficult to form inks in which stable pigment suspension liquids can be formulated using the same dispersant. That notwithstanding, the dispersants described herein have been found to be compatible with at least one pigment in each of the four primary printing colors.

For black inks, carbon black can be used as the black pigment. The selection of carbon blacks suitable for use with the present invention is based primarily upon considerations of surface oxidation (high "volatiles" preferred), and the degree of blackness (also called jetness) of the pigment. Pigments that are acidic or surface-treated provide suitable interaction sites for strong dispersant adsorption. Pigments having a high surface oxide content are more hydrophilic, and thereby much easier to disperse. Pigments with a high degree of blackness or jetness provide a high quality printed image.

For yellow inks, the use of nickel azo yellow pigment offers several advantages. First, such pigments provide inks which are highly durable in outdoor environments. Second, such pigments contain nickel ions which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink, thereby allowing proper bubble formation.

For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, (i.e., lightfastness, durability, etc.), apply as well. As a variety of satisfactory properties may be found using copper phthalocyanine as a cyan pigment, inks comprising such pigments are one preferred embodiment.

Dispersant: The dispersants of the invention are particularly useful in stabilizing dispersions of hydrophobic materials (e.g., organic pigments and the like) in liquid dispersions and suspensions, especially aqueous dispersions and suspensions. The dispersants of the present invention may be the reaction products of N-substituted amino acid compounds and alkenyl azlactones. The substituents on both the N-substituted amino acid compounds and the alkenyl azlactone may be selected to tailor the physical properties of the resulting dispersant to the needs of particular combinations of surfaces and/or compounds which are to be stabilized within the dispersion.

The dispersants of the invention are prepared by reacting N-substituted amino acid compounds with alkenyl azlactones, such as vinyl azlactones. Examples of N-substituted amino-acid compounds include, but are not limited to N-substituted amino acid esters of the following N-substituted amino acids: N-methylglycine, N-butyl-2-(3, 5,7-trimethyl-1-adamantyl)glycine, N-phenlglycine, N-(2-cyanoethyl)glycine, N-methyl-(l)-alanine, N-methyl-(d)-alanine, N-methyl-(dl)-alanine, 2-(methylamino) isobutyric acid, N-methyl-(d)-aspartic acid, N-benzyl-(dl)-aspartic acid, sarcosine, iminodiacetic acid, ethylene-N,N'-diacetic acid, Imidazole-4,5-dicarboxylic acid, L-thiazolidine-4-carboxylic acid, 3,4-dehydro-(dl)-proline, Pyrrole-2-carboxylic acid, (dl)-proline, diglycine, N-methyl-(dl)-glutamic acid, N-methyl-(d)-phenylalanine, N-methyl-(l)-leucine, N-α-methyl-(l)-histidine, H-meval-OH, 2,2'-(ethylenediamino)-dibutyric acid, N-cyclohexyl-β-alanine, (±)-cis-2,3-piperidine dicarboxylic acid, cis-2,5-piperidine dicarboxylic acid, carboxyethyl-gamma-amino acid, ethylenediamine-N,N'-dipropionic acid, (±)-cis-2-piperazine carboxylic acid, L-trans-pyrollidine-2,4-dicarboxylic acid, 2,2'-iminobis(1-cyclopentanecarboxylic acid), cis-2-(ethylamino)-1-cyclohexanecarboxylic acid. The reaction of amino acids which contain primary amines, alcohols or thiols, (i.e., lysine, serine, or cysteine), with alkenyl azlactones would result in ring-opened products, rather than the desired Michael adduct, however, appropriately protected derivatives of these amino acids would be suitable. Methods of protecting amino acids are well-known in the art and are used extensively in the preparation of peptides.

One preferred embodiment of the N-substituted amino acid compounds is the class of compounds commonly referred to as "aspartic esters". Aspartic esters are hereinafter defined as the reaction product of a primary amine with an optionally substituted maleic or fumaric ester as shown in the following scheme:

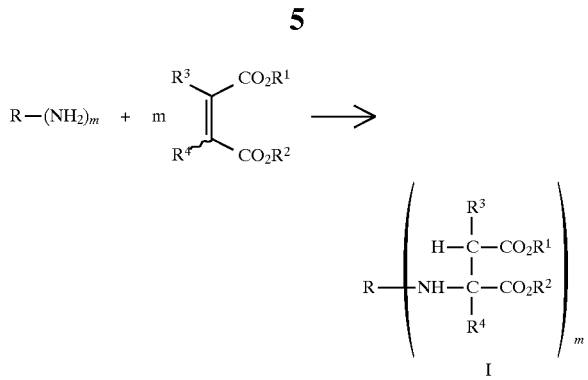

where R is an alkyl, aryl, or aralkyl group obtained by the removal of primary amino groups from alkyl, aryl, or aralkyl amines, m=1 to 6

$R^1$ and $R^2$ are alkyl, aryl, or aralkyl, and $R^3$ and $R^4$ are hydrogen or lower alkyl.

Examples of R include monovalent groups such as methyl, ethyl, butyl, octyl, hexadecyl, octadecyl, phenyl, and phenethyl which are obtained upon removal of the amino groups from the corresponding primary amines, divalent groups which are obtained after the removal of the primary amino groups from diamines such as 1,4-diaminobutane, 1,6-diaminohexane, 1,12-diaminododecane, 1,3-diaminopentane, 2-methyl-1,5-pentanediamine, 2,2,4- and 2,4,4-trimethyl-1,6-diaminohexane, 1-amino-3,3,5-trimethyl-5-aminomethylcyclohexane, 4,4'-diaminodicyclohexylmethane, and 3,3-dimethyl-4,4'-diaminodicyclohexyl methane. Other examples of R include the groups which are obtained after the removal of the primary amino groups from primary amines which contain secondary or tertiary amino groups such as N-ethylethylenediamine, N,N-dibutylethylenediamine, 3,3'-iminobispropylamine, triethylenetetramine, and spermidine. Other examples of R include the groups groups which are obtained after the removal of the primary amino groups from polyether amines such as 4,7,10-trioxa-1,13-tridecanediamine and amine terminated polyethers such as those marketed under the Jeffamine trademark by the Huntsman Corporation, Salt Lake City, Utah. An example of a trivalent R group is the group which is obtained after the removal of the primary amino groups from tris(2-aminoethyl)amine.

Examples of $R^1$ and $R^2$ include methyl, ethyl, propyl, n-butyl, t-butyl, octyl, hexadecyl, tridecafluoro-1-octanol, and benzyl.

Examples of $R^3$ and $R^4$ include hydrogen, methyl, and ethyl.

Other examples of suitable amines and the aspartic esters derived from them are described in U.S. Pat. Nos. 5,243,012 and 5,236,741.

The alkenyl azlactone compounds which are useful in the practice of the present invention may be partially defined by the following Formula (II):

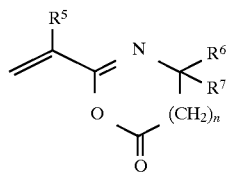

wherein $R^5$ is hydrogen or methyl $R^6$ and $R^7$ are independently hydrogen, alkyl, or aryl and n is 0 or 1.

Nonlimiting examples of alkenyl azlactones and their syntheses are disclosed in U.S. Pat. Nos. 4,304,705; 5,081,197; and 5,091,489. Suitable alkenyl azlactones include:

2-ethenyl-1,3-oxazolin-5-one, 2-ethenyl-4-methyl-1,3-oxazolin-5-one, 2-isopropenyl-1,3-oxazolin-5-one, 2-isopropenyl-4-methyl-1,3-oxazolin-5-one, 2-ethenyl-4,4-dimethyl-1,3-oxazolin-5-one, 2-isopropenyl-4,4-dimethyl-1,3-oxazolin-5-one, 2-ethenyl-4-methyl-4-ethyl-1,3-oxazolin-5-one, 2-isopropenyl-4-methyl-4-butyl-1,3-oxazoline-5-one, 2-ethenyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-ethenyl-4,4-diethyl-1,3-oxazolin-5-one, 2-ethenyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxzone-5-one, and 2-ethenyl-4,4-pentamethylene-1,3-oxazolin-5-one.

The preferred 2-alkenyl azlactones include 2-ethenyl-4,4-dimethyl-1,3-oxazolin-5-one (referred to herein as VDM); and 2-isopropenyl-4,4-dimethyl-1,3-oxazolin-5-one (referred to herein as IDM).

The aspartic esters of Formula I and the alkenyl azlactones of Formula II are reacted together to produce the azlactone material of Formula III. This compound of Formula III is the result of a Michael-addition of the nitrogen atoms of the aspartic ester of Formula I to the carbon-carbon double bond of the alkenyl azlactone of Formula II. Details and other examples of this Michael addition of alkenyl azlactones are disclosed in U.S. Pat. Nos. 4,485,236; 4,699,843; 5,149,806; 5,194,623; 5,268,473; and 5,292,514.

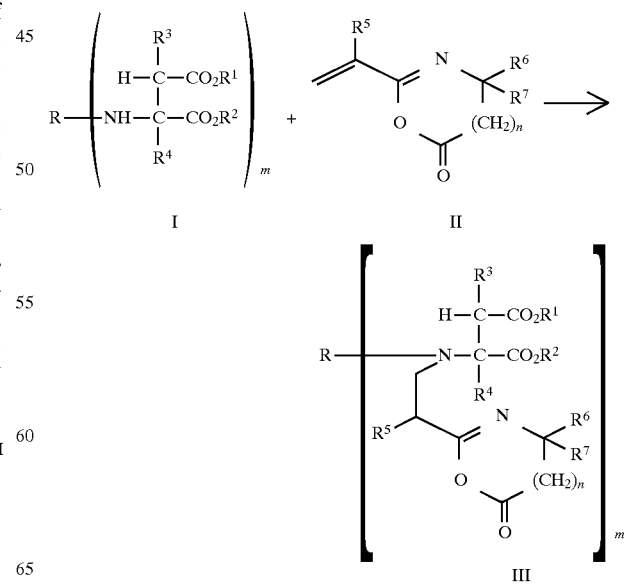

The next step in the preparation of the dispersants of the present invention involves a ring opening reaction of the azlactone rings of the compound of Formula III. The ring opening compound may be any free hydrogen donating nucleophile (e.g., alcohol, mercaptan, or amine) and is preferably an amine. This ring opening reaction of azlactones is well known in the art and exemplified in more detail in U.S. Pat. Nos. 4,451,619; 4,931,582; 5,216,084; and 5,336,742, as well as in previously noted U.S. Pat. No. 5,194,623.

Preferred examples of amines useful as ring opening compounds in the practise of the present invention are exemplified by Formula IV.

IV wherein $R^8$ is an alkyl group, aryl group, oligomeric groups (e.g., polyoxyalkylene of 100 to 10,000 MW) or fluorinated alkyl (e.g., highly fluorinated alkyl groups of 20 to 765 by weight fluorine, as where at least 40% of the hydrogen atoms have been replaced by fluorine); and $R^{11}$ is H or $R^8$.

Ring opening of the compounds of Formula III with the compounds of Formula IV produces compounds of Formula V, which represent some of the preferred dispersants of the present invention.

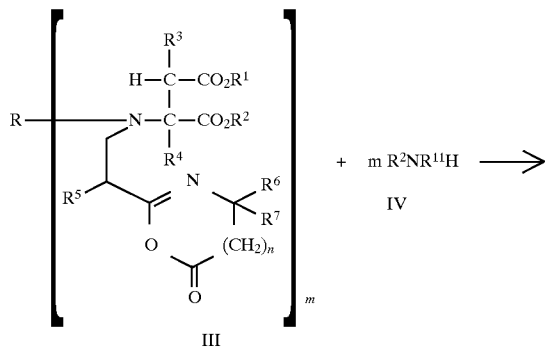

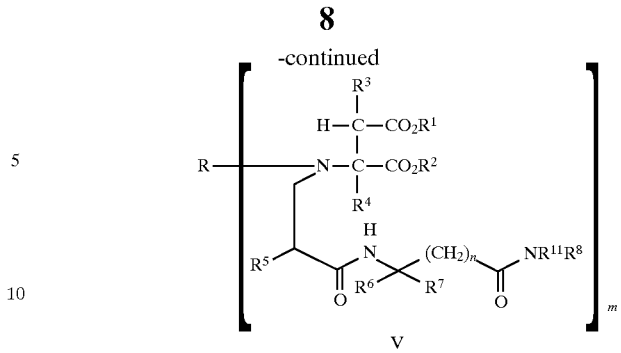

In other instances, the compound of Formula V may be treated with a hydroxide salt such as lithium hydroxide, sodium hydroxide, potassium hydroxide, ammonium hydroxide, or a tetrasubstituted ammonium hydroxide such as tetramethylammonium hydroxide or tetrabutylammonium hydroxide to cause hydrolysis of one or more of the ester groups $CO_2R^1$ and $CO_2R^2$. In some instances, it may be desirable to remove the groups $R^1$ and $R^2$ by other methods well known in the art, for example, hydrogenolysis of a benzyl ester or acid catalyzed removal of a tertiary butyl ester. This treatment of the compounds of Formula V produces the dispersant compounds of the present invention of Formula VI, wherein $R^9$ and $R^{10}$ are independently $R^1$ or $R^2$, respectively, or a cation such as a proton, lithium, sodium, potassium, ammonium, or tetraalkyl ammonium such as tetramethylammonium or tetrabutylammonium.

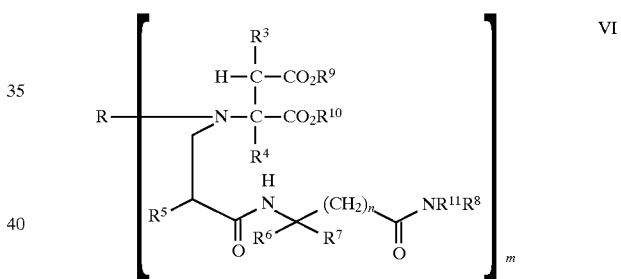

Specific compositions of dispersants used in the Examples are given in the Table below.

| Ex | R* | $R^3$ | $R^4$ | $R^5$ | $R^6$ | $R^7$ | $R^8$ | $R^9$ | $R^{10}$ | $R^{11}$ | m | n |
|---|---|---|---|---|---|---|---|---|---|---|---|---|
| 1 | R | H | H | H | $CH_3$ | $CH_3$ | $C_4H_9$ | Na | Na | H | 2 | 0 |
| 2 | R | H | H | H | $CH_3$ | $CH_3$ | $C_8H_{17}$ | Na | Na | H | 2 | 0 |
| 3 | R | H | H | H | $CH_3$ | $CH_3$ | $C_{12}H_{25}$ | Na | Na | H | 2 | 0 |
| 4 | R | H | H | H | $CH_3$ | $CH_3$ | $C_{18}H_{37}$ | Na | Na | H | 2 | 0 |
| 5 | R | H | H | H | $CH_3$ | $CH_3$ | $CH_2CH_2C_6H_5$ | Na | Na | H | 2 | 0 |
| 6 | $C_6H_5CH_2CH_2$ | H | H | H | $CH_3$ | $CH_3$ | $C_4H_9$ | Na | Na | H | 1 | 0 |
| 7 | $N(CH_2CH_2)_3$ | H | H | H | $CH_3$ | $CH_3$ | $C_4H_9$ | Na | Na | H | 3 | 0 |
| 8 | R | H | H | H | $CH_3$ | $CH_3$ | R** | $C_2H_5$ | $C_2H_5$ | H | 2 | 0 |
| 9 | R | H | H | H | $CH_3$ | $CH_3$ | R*** | $C_2H_5$ | $C_2H_5$ | H | 2 | 0 |

*The aspartic ester used in the preparation of the dispersant of examples 1–5, 8 and 9 was Desmophen ™ XP 7059E, available from the Bayer Corporation, Pittsburg, PA. Desmophen ™ XP 7059E contains a short chain alkyl group.
**The amine used in the ring opening reaction to prepare dispersant of Example 8 was Jeffamine ™ M-600 [O-(2-aminopropyl)-O'-(methoxyethyl)polypropylene glycol 500] (available from Fluka Chemical Corp. Ronkonkoma, NY).
***The amine used in the ring opening reaction to prepare dispersant of Example 9 was Jeffamine ™ M-1000 [O-(2-aminopropyl)-O'-(2-methoxyethyl)copoly(ethylene, propylene glycol 900] (available from Fluka Chemical Corp. Ronkonkoma, NY).

In the practice and the field of the present invention, the groups which are not directly involved in the reaction steps forming the compounds of the present invention may be substituted to meet desired physical property requirements in the final dispersants. This is not only allowable, but may be highly desirable or essential in the formation of tailored dispersants. Where individual substituents may tolerate such broad substitution, they are referred to as groups. Where no substitution is allowed, they are referred to as. For example, the term "alkyl group" may allow for ester linkages or ether linkages, unsubstituted alkyls, alkyls with such useful substitution as halogen, cyano, carboxylic ester, sulfonate esters or salts, and the like. Where the term "alkyl" or "alkyl moiety" is used, that term would include only unsubstituted alkyls such as methyl, ethyl, propyl, butyl, cyclohexyl, isooctyl, dodecyl, etc.

Inks: In addition to the pigments and dispersants described above, the inks will comprise primarily water as a pigment suspension agent. Such inks will typically also include further additives to provide various properties. For example, an alcoholic polyol, may be employed to control the drying rate of the ink. Suitable alcoholic polyols include, for example, polyalkylene glycols such as polyethylene glycol and polypropylene glycol; alkylene glycols whose alkylene group has 2–6 carbon atoms, such as ethylene glycol, propylene glycol, butylene glycol, triethylene glycol, 1,2,6-hexanetriol, thiodiglycol, hexylene glycol, and diethylene glycol; glycerol; and lower alkyl ethers of alcoholic polyols such as ethylene glycol monomethyl or monoethyl ether, diethylene glycol methyl or ethyl ether, and triethylene glycol monomethyl or monoethyl ether. A surfactant, useful for wetting and reducing the surface tension of the ink system, can be provided as well. In addition to the above, other ink additives commonly known in the art may also be used. These include, water-soluble organic cosolvents, humectants, biocides, fungicides, defoamers, corrosion inhibitors, viscosity modifiers, pH buffers, penetrants, sequestering agents, and the like.

Ink Processing:

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

Problems associated with media milling systems can be overcome, at least in part, using homogenizers and emulsifiers. These systems generally function by forcing a premix of solids and liquids to collide against a surface, or to collide against itself. Unfortunately such high pressure devices are considered to be unsuitable for processing pigment dispersions due to the abrasive nature of the pigment particles and the relatively large size of pigment agglomeration structures which can plug narrow gaps through which such systems force the mixture being treated. Such clogging can be avoided, at least in part, by filtration or preprocessing to reduce the size of pigment agglomerations and to ensure sufficient dispersion of the pigment prior to use of high pressure processing.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks.

After the ink has been processed using either of the "wedge" configurations or the "impinging jet" configuration at a concentration of about 15% by weight, it is diluted with an additional amount of deionized water and diethylene glycol to produce a final ink concentration of about 4% concentration with a given diethylene glycol-to-water ratio. In the dilution step, the dispersion is mixed using a shear mixer (available, for example, from Silverson Machines Inc., East Longmeadow, Mass.) at moderate speed while water and diethylene glycol are sequentially added. The addition of diethylene glycol is carried out slowly to prevent flocculation of the dispersion.

Following the dilution step, the ink is filtered using, for example, a 5 micron Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi is preferred.

EXAMPLES

Examples 1–5

A 32 oz. glass jar was charged with 138.2 g of aspartic ester (obtained from Bayer #XP7059E) and 83.5 g of vinyldimethyl azlactone (available from SNPE, Princeton, N.J.). The jar was sealed and placed in an oven at 60° C. for 3 days. After this period, the jar was removed from the oven, cooled, opened, and 0.60 mol of an amine (n-butylamine for Example 1, n-octylamine for Example 2, n-dodecylamine for Example 3, n-octadecylamine for Example 4, or phenethylamine for Example 5) was added in portions over a 30 min. period (exothermic reaction). The jar was sealed and placed back in a 60° C. oven overnight. After this period, ethanol (200 mL) was added to dissolve the product, and 5 Normal sodium hydroxide solution (230 mL) was added. The reaction mixture was agitated with brief warming on a steam bath to affect solution, then allowed to stand overnight at room temperature. Most of the ethanol was removed at reduced pressure and the remaining aqueous solution was extracted with three 250 mL portions of ethyl acetate. (For example 4, the ethyl acetate extraction step was omitted.) The aqueous solution was rotovapped again at reduced pressure to remove any remaining organic solvent. Percent solids were determined by heating a 2–3 g sample at 110° C. for 2 hours. Sufficient water was then added to make a 50% solution of the desired product in water.

Example 6

A 16 oz. glass jar was charged with 30.3 g of phenethylamine (available from Aldrich Chemical Co.) and 43.0 g of diethylmalonate (available from Aldrich Chemical Co.) The jar was sealed and placed in an oven at 60° C. for 2 days. After this period, the jar was removed from the oven, cooled, opened, and 34.8 g of vinyldimethyl azlactone (available from SNPE, Princeton, N.J.) were added. The jar was sealed and placed back in an oven at 60° C. for 3 days. After this period, the jar was removed from the oven, cooled, opened, and 18.3 g of n-butylamine were added in portions over a 30 min. period (exothermic reaction). The jar was sealed and placed back in a 65° C. oven overnight. After this period, ethanol (100 mL) was added to dissolve the product, and a solution of 20 g of sodium hydroxide in 100 mL of water was added. The reaction mixture was agitated with brief warming on a steam bath to affect solution, then allowed to stand overnight at room temperature. Most of the ethanol was removed at reduced pressure and the remaining aqueous solution was extracted with three 150 mL portions of ethyl acetate. The aqueous solution was rotovapped again at reduced pressure to remove any remaining organic solvent. Percent solids were determined by heating a 2–3 g sample at 110° C. for 2 hours. Sufficient water was then added to make a 50% solution of the desired product in water.

Example 7

A 16 oz. glass jar was charged with 21.9 g of tris(2-aminoethyl)amine (available from Aldrich Chemical Co.) and 77.5 g of diethylmalonate (available from Aldrich Chemical Co.) The jar was sealed and placed in an oven at 60° C. for 2 days. After this period, the jar was removed from the oven, cooled, opened, and 62.6 g of vinyldimethyl azlactone (available from SNPE, Princeton, N.J.) were added. The jar was sealed and placed back in an oven at 60° C. for 3 days. After this period, the jar was removed from the oven, cooled, opened, and 32.9 g of n-butylamine were added in portions over a 30 min. period (exothermic reaction). The jar was sealed and placed back in a 65° C. oven overnight. After this period, ethanol (125 mL) was added to dissolve the product, and a solution of 36 g of sodium hydroxide in 100 mL of water was added. The reaction mixture was agitated with brief warming on a steam bath to affect solution, then allowed to stand overnight at room temperature. Most of the ethanol was removed at reduced pressure and the remaining aqueous solution was extracted with four 150 mL portions of ethyl acetate. The aqueous solution was rotovapped again at reduced pressure to remove any remaining organic solvent. Percent solids were determined by heating a 2–3 g sample at 110° C. for 2 hours. Sufficient water was then added to make a 50% solution of the desired product in water.

Examples 8 and 9

A 16 oz. glass jar was charged with 23.0 g of aspartic ester (Bayer #XP 7059E) and 13.9 of vinyidimethyl azlactone (available from SNPE, Princeton, N.J.). The jar was sealed and placed in an oven at 65° C. for 3 days. After this period, the jar was removed from the oven, cooled, opened, and 0.10 mol of the amine (Jeffamine™ M-600 [O(2-aminopropyl)-O'-(methoxyethyl)polypropylene glycol 500] for Example 8, or Jeffamine™ M-1000 [O-(2-aminopropyl)-O'-(2-methoxyethyl)copoly(ethylene)propylene glycol 900] for Example 9, (both available from Fluka Chemical Corp., Ronkonkoma, N.Y.) was added. The jar was sealed and placed back in a 70° C. oven for 2 days. The product was used directly without any further purification.

Example 10 (Black)

A pigmented black ink was prepared from a dispersion using the following procedure:

1. 5.3 grams of a 50% solution of a dispersant was weighed into an 8 oz. glass jar. The dispersant was that of Example 1 above.
2. 71.8 grams of de-ionized water was added to the dispersant.
3. 18.9 grams of photographic grade diethylene glycol (obtained from Sigma Chemical Co., St. Louis, Mo., hereafter "Sigma") was added to the aqueous dispersant mixture.
4. The solution was mixed using gentle shaking until a homogeneous solution was obtained. The pH of the solution was measured at this point and determined to be 10.6.
5. 4.0 grams of Degussa Special Black 4 (obtained from Degussa Corporation, Ridgefield Park, N.J., hereafter "Degussa") was added to the solution.
6. The resulting mixture was again mixed by gentle shaking to avoid excess foam formation. At this point, the pH of the resulting mixture was measured and determined to be 9.2.
7. The pigment was dispersed by using a model XL2020 Sonicator (made by Misonix Incorporated, Farmingdale, N.Y., hereafter "Misonix") for 2 minutes at a setting of 187 Watts, then for an additional 3 minutes at a setting of 110 Watts.

The final ink was made by weighing 30.0 grams of the above dispersion into a solution which contained 1.0 gram of Triton X-100 surfactant (obtained from Union Carbide Chemical and Plastics company Inc., Danbury, Conn. hereafter "Union Carbide"), 4.0 grams of diethylene glycol (from Sigma, photographic grade), and 16.0 grams of deionized water. Before subjecting the ink to a printing test, the ink was treated in a Branson 5200 ultrasonic bath (obtained from Branson Ultrasonics Corporation, Danbury, Conn., hereafter "Branson") followed by centrifugation using a Sorvall GLC-2B General Laboratory Centrifuge at 2800 rpm (dial reading) for 30 minutes to remove large particles.

The ink was filled into a clean, empty HP 51626A DeskJet cartridge and test printed using a NovaJet II printer. Continuous printing was carried out to print 34"×36" solid blocks onto 3M Scotchprint™ Opaque Ink Jet Film (Product No. 8502) until the cartridge was empty. The ink printed continuously without any problem to produce a uniform black image of good quality. No nozzle plugging was observed during the entire printing process, no banding was visible on the printed image, and the appearance of the color density remained the same from the beginning to the end of the solid printed blocks.

Example 11 (Yellow)

A pigmented yellow ink was prepared from a dispersion using the following procedure:

1. 69.6 gms of deionized water was weighed into an 8 oz. glass jar.
2. 18.9 grams of photographic grade diethylene glycol (available from Sigma) was added to the water.
3. 8.0 grams of a 25% solution of a dispersant was added to the mixture. The dispersant was that of Example 2 above.
4. The resulting solution was mixed by gentle shaking until a homogeneous solution was obtained.
5. 3.5 grams of Bayer Fanchon Fast Yellow Y-5688 C.I. Pigment Yellow was then added to the above solution.
6. Again, the mixture was mixed by gentle shaking to avoid excess foam formation. At this point, the pH of the solution was determined and found to be 10.5.

7. The pigment was dispersed by using a Misonix model XL2020 Sonicator for 5 minutes at a setting of 138 Watts.
8. The dispersion was then centrifuged using a Sorvall GLC-2B General Laboratory Centrifuge at 2800 rpm (dial reading) for 30 minutes to remove large particles.

The final ink was made by weighing 30.0 grams of the above dispersion into a solution which contained 0.6 gram of Triton X-100 surfactant and 2.0 grams of de-ionized water.

The ink was filled into a clean empty HP 51626A DeskJet cartridge and test printed using a NovaJet printer. Continuous printing was carried out to print 34"×36" solid blocks onto 3M Scotchprint™ Opaque Ink Jet Film (Product No. 8502) until the cartridge was empty. The ink printed continuously without any problem to produce a uniform yellow image of excellent quality. No nozzle plugging was observed during the entire printing process, no banding was visible on the printed image, and the appearance of the color density remained the same from the beginning to the end of the solid printed blocks.

Example 12 (Yellow)

A second pigmented yellow ink was prepared using the following procedure:
1. 5.0 grams of a 40% solution of a dispersant was weighed into an 8 oz. glass jar. The dispersant was that of Example 2 above.
2. 72.6 grams of de-ionized water was added to the dispersant.
3. 18.9 grams of photographic grade diethylene glycol (obtained from Sigma) was added to the mixture.
4. The mixture was shaken gently until a homogeneous solution was obtained. The pH of the mixture was measured and determined to be 9.8.
5. 3.5 grams of Bayer Fanchon Fast Yellow Y-5688 C.I. Pigment Yellow 150 was mixed into the above solution.
6. Again, the mixture was mixed by gentle shaking to avoid excess foam formation. The pH was again measured and determined to be 9.5.
7. The pigment was dispersed by using a Misonix model XL2020 Sonicator for 2 minutes at a setting of 187 Watts.
8. The dispersion prepared according to the above procedure was added to a solution which contained 3.0 grams of Triton X-100 surfactant, 13.6 grams of de-ionized water, and 3.4 grams of photographic grade diethylene glycol.
9. Next, the mixture was treated in a Branson 5200 ultrasonic bath for 10 minutes, followed by centrifugation using a Sorvall GLC-2B General Laboratory Centrifuge at 2800 rpm (dial reading) for 1 hour to remove large particles.

The resulting ink was filled into a clean empty HP 51626A DeskJet cartridge and test printed using a NovaJet printer. Continuous printing was carried out to print 34"×36" solid blocks onto 3M Scotchprint™ Opaque Ink Jet Film (Product No. 8502) until the cartridge was empty. The ink printed continuously without any problem to produce a uniform yellow image of good quality. No nozzle plugging was observed during the entire printing process, no banding was visible on the printed image, and the appearance of the color density remained the same from the beginning to the end of the solid printed blocks.

Example 13 (Yellow)

A third pigmented yellow ink was prepared using the following procedure:

1. 145.2 grams of de-ionized water were weighed into a 16 oz. glass jar.
2. 37.8 grams of photographic grade diethylene glycol was added to the water.
3. 10.0 grams of a 40% solution of a dispersant was added to the mixture. The dispersant was that of Example 2 above.
4. 7.0 grams of Bayer Fanchon Fast Yellow Y-5688 C.I. Pigment Yellow 150 was added to the above solution.
5. The mixture was mixed by gentle shaking to avoid excess foam formation.
6. The pigment was dispersed by using a Misonix model XL2020 Sonicator at a setting of 138 Watts for 3 minutes, at a setting of 203 Watts for 1 minute, and then at a setting of 138 Watts for an additional 2 minutes.
7. The mixture then was centrifuged using a Sorvall GLC-2B General Laboratory Centrifuge at 2800 rpm (dial reading) for 1 hour to remove large particles.

The ink was filled into a clean empty HP 51626A DeskJet cartridge and test printed using a NovaJet printer. Continuous printing was carried out to print 34"×36" solid blocks onto 3M Scotchprint™ Opaque Ink Jet Film (Product No. 8502) until the cartridge was empty. The ink printed continuously without any problem to produce a uniform yellow image of good quality. No nozzle plugging was observed during the entire printing process, no banding was visible on the printed image, and the appearance of the color density remained the same from the beginning to the end of the solid printed blocks.

Example 14 (Magenta)

A first pigmented magenta ink was prepared according to the following procedure:
1. 69.8 gms of deionized water was weighed into an 8 oz. glass jar.
2. 5.0 grams of a 40% solution of a dispersant was added to the mixture. The dispersant was that of Example 2 above.
3. 3.5 grams of Quindo Magenta RV-6828 Pigment Red 122 powder (available from Bayer) was added to the mixture.
4. 18.2 grams of photographic grade diethylene glycol was added and the dispersion was mixed.
5. 3.5 grams of Triton X-100 surfactant was then added.
6. A Misonix model XL2020 Sonicator was used to disperse the pigment by irradiating the above mixture for 15 seconds at a setting of 192 Watts, then 3 minutes at a setting of 138 Watts, followed by an additional 1 minute at a setting of 192 Watts.
7. The dispersion was then centrifuged at 2800 rpm (dial reading) for one hour using a Sorvall GLC-2B General Laboratory Centrifuge to remove large particles.

The resulting ink was filled into a clean empty HP51626A DeskJet cartridge for printing test. The test was carried out using a NovaJet II printer by continuous jetting to generate 34"×36" blocks of a magenta image on a 3M Scotchprint™ Opaque Ink Jet Film (Product No. 8502). The printing continued until the cartridge was empty. The solid blocks of image printed this way looked uniform in color with no banding at all. In addition, there was no visible difference in color density from the beginning of the printed image to the end of the printed image.

Example 15 (Magenta)

A second pigmented magenta ink was prepared using the same procedure described in Example 14 except that 3.5 grams of Tergitol NP-8 surfactant (available from Union Carbide) was substituted for the Triton X-100 surfactant used in step no. 5.

The final ink was tested the same way as described in the first example. The entire printed solid blocks also looked uniform in color with no banding at all. There was no visible difference in color density from the beginning of the printed image to the end of the printed image.

Examples 16A–16B (Magenta)

A. A magenta ink concentrate was provided. The concentrate comprised Sunfast Magenta Presscake 202 (50% solids) (obtained from Sun Chemical Corp.) in an aqueous diethylene glycol (DEG) suspension medium. The ratio of pigment to the DEG (aq.) was 3/1 by weight. The suspension medium was 30% by weight DEG with the balance being water.

83.5 grams of the ink concentrate was suspended in 350 grams of a mixture of 30/70 DEG/water. Approximately 12–15 grams of Triton X-100 surfactant was added, followed by 50 grams of a 15% emulsion of dispersant. The dispersant was that of Example 4 above.

The mixture was thoroughly sheared in a shear grinder (Hill mixer) to obtain a 15% concentrate. The Hill mixer is a high speed impingement homogenizer-mixer which consists of a spiral propeller with a grapefruit style head for greater suction through the head from the propeller. The mixer motor is rated at 1 HP with a capability of 10,000 rpm. Propeller speeds up to 4000 rpm can be run in forward or reverse and both modes were used for grinding.

The concentrate was processed using the impinging jet process (described above), filtered as described above, and tested for printing on an Encad Novajet III printer. The print was satisfactory. No nozzle blocking was reported and banding of the print was not significant.

B. This Example is identical to Example 16A with the exception that Sunfast Magenta Presscake 122 (50% solids) (obtained from Sun Chemical Corp.) was substituted for Sunfast Magenta Presscake 202 of Example 16A.

The concentrate was processed using the impinging jet process (described above), filtered as described above, and tested for printing on an Encad Novajet III printer. The print was satisfactory. No nozzle blocking was reported and banding of the print was not significant.

Example 17A–17B (Cyan)

A. A cyan ink concentrate was provided. The concentrate comprised Sunfast Blue 15:3 Presscake (50% solids) (obtained from Sun Chemical Corp.) in an aqueous diethylene glycol (DEG) suspension medium. The ratio of pigment to the DEG(aq.) was 7/2 by weight. The suspension medium was 60% by weight DEG with the balance being water.

The ink mixture was combined with an azlactone-derived dispersant of the type described previously. In particular, the dispersant that of Example 1 above.

86.5 grams of the pigment mixture, 25 grams of a 50% solution of the dispersant, 15 grams of Surfynol CT-136 (an auxiliary surfactant obtained from Air Products), 50 grams of water and 200 grams of DEG was ground for five minutes at low speeds in a Hill grinder/mixer. (The Hill grinder/mixer is a high speed homogenizer which includes a spiral propeller with a Grapefruit style Head for greater suction through the head from the propeller). The shear grinding was then continued at high propeller speeds both in forward and reverse directions for ten minutes. The adhering concentrate was recovered from the stirrer by washing with additional amounts of deionized water (approx. 30 grams). A concentrate having a solids content of approximately 15% and a particles size in the range of about 120–140 nm was collected.

B. The same concentrate in the dispersion medium of DEG/water=30/70 was prepared by replacing the quantities of DEG and water in the above preparation with 140 grams and 110 grams respectively.

In each of the inks prepared in examples 17A and 17B, the print was satisfactory. No nozzle blocking was reported and banding of the print was not significant Example 18 (Cyan)

A cyan ink concentrate was provided. The concentrate comprised Sunfast Blue 15:3 Presscake (50% solids) (obtained from Sun Chemical Corp.) in an aqueous diethylene glycol (DEG) suspension medium. The ratio of pigment to the DEG(aq.) was 7/4 by weight. The suspension medium was 60% by weight DEG with the balance being water.

The ink mixture was combined with an azlactone-derived dispersant of the type described previously. In particular, the dispersant was that of Example 2 above.

86.5 grams of the pigment mixture, 50 grams of a 50% solution of the dispersant, 15 grams of Surfynol CT-136 (an auxiliary surfactant obtained from Air Products), 50 grams of water and 222 grams of DEG was ground for five minutes at low speeds in a Hill grinder/mixer. The shear grinding was then continued at high propeller speeds both in forward and reverse directions for ten minutes. The adhering concentrate was recovered from the stirrer by washing with additional amounts of deionized water (approx. 30 grams). A concentrate having a solids content of approximately 15% and a particles size in the range of about 120–140 nm was collected.

Example 19 (Cyan Dispersion Ratios)

Dispersant ratios for the pigments used in the cyan examples were varied through a range of 5:1 to 7:4. The best working inks were obtained using a ratio of 7:2 for the ink of examples 17A and 17B and of 7:4 for the ink of example 18, although the dispersions were highly stable over a wide range of ratios.

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A water-based pigmented ink which comprises an suspension of:
   a) pigment particles, and
   b) a dispersant which comprises a reaction product of an alkenyl azlactone with an N-substituted amino acid compound which, subsequent to reaction, has been ring-opened using an amine.

2. A water-based pigmented ink as in claim 1 wherein the azlactone comprises an azlactone selected from the group consisting of 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-4-methyl-4-butyl-1,3-oxazoline-5-one; 2-ethenyl4,4-dibutyl-1,3-oxazolin-5-one; 2-isopropenyl-4-methyl-4-dodecyl-1,3-oxazolin-5-one; 2-isopropenyl-4,4-diphenyl-1,3-oxazolin-5-one; 2-isopropenyl-4,4-pentamethylene-1,3-oxazolin-5-one; 2-isopropenyl-4,4-tetramethylene-1,3-oxazolin-5-one; 2-ethenyl-4,4-diethyl-1,3-oxazolin-5-one; 2-ethenyl-4-methyl-4-nonyl-1,3-oxazolin-5-one; 2-isopropenyl-4-methyl-4-phenyl-1,3-oxazolin-5-one; 2-isopropenyl-4-methyl-4-benzyl-1,3-oxzone-5-one; and 2-ethenyl-4,4-pentamethylene-1,3-oxazolin-5-one.

3. A water-based pigmented ink as in claim 1 wherein the N-substituted amino acid compound comprises an aspartic ester.

4. A water-based pigmented ink as in claim 3 wherein the aspartic ester comprises a mono- or bis- aspartic ester.

5. A water-based pigmented ink as in claim 1 wherein the amine is selected from the group consisting of polyether, butyl, octyl, dodecyl, phenethyl, and octadecyl amines.

6. A water-based pigmented ink as in claim 1 wherein, subsequent to ring opening, a hydrolysis reaction is carried out.

7. A water-based pigmented ink as in claim 6 wherein the hydrolysis is carried out using sodium hydroxide, lithium hydroxide, potassium hydroxide, or an ammonium hydroxide.

8. A water-based pigmented ink as in claim 1 which further comprises a surfactant.

9. A water-based pigmented ink as in claim 1 which further comprises a alcoholic polyol.

10. A water-based pigmented ink as in claim 9 wherein the alcoholic polyol comprises an ethylene glycol.

11. A water-based pigmented ink as in claim 1 wherein the pigment is selected from the group consisting of black, yellow, magenta, and cyan pigments.

12. A water-based pigmented ink as in claim 11 wherein the black pigment comprises a carbon black pigment.

13. A water-based pigmented ink as in claim 11 wherein the yellow pigment comprises a nickel azo yellow pigment.

14. A water-based pigmented ink as in claim 11 wherein the magenta pigment comprises a quinacridone magenta pigment.

15. A water-based pigmented ink as in claim 11 wherein the cyan pigment comprises a copper phthalocyanine pigment.

16. A water-based pigmented ink as in claim 1 wherein the dispersant comprises:

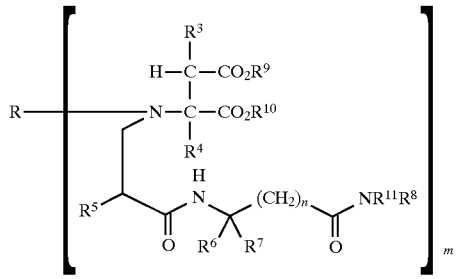

wherein

R is an alkyl, aryl, or aralkyl group;

$R^3$ and $R^4$ are hydrogen or lower alkyl;

$R^5$ is hydrogen or methyl;

$R^6$ and $R^7$ are independently hydrogen, alkyl, or aryl;

$R^8$ is an alkyl group, aryl group, oligomeric or fluorinated alkyl;

$R^9$ and $R^{10}$ are independently alkyl, aryl, or aralkyl, respectively, or a cation;

$R^{11}$ is H or $R^8$ m is 1–6; and n is 0 or 1.

17. A water-based pigmented ink which comprises, a suspension of:

a) pigment particles, and b) a dispersant made by a process which comprises i) reacting an alkenyl azlactone with an N-substituted amino acid compound to form a first reaction product, and ii) ring-opening the first reaction product using an amine, to thereby form a second reaction product.

18. A water-based pigmented ink as in claim 17 wherein the azlactone comprises an azlactone selected form the group consisting of 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-4-methyl-4-butyl-1,3-oxazoline-5-one; 2-ethenyl-4,4-dibutyl-1,3-oxazolin-5-one; 2-isopropenyl-4-methyl-4-dodecyl-1,3-oxazolin-5-one; 2-isopropenyl-4,4-diphenyl-1,3-oxazolin-5-one; 2-isopropenyl-4,4-pentamethylene-1,3-oxazolin-5-one; 2-isopropenyl-4,4-tetramethylene-1,3-oxazolin-5-one; 2-ethenyl-4,4-diethyl-1,3-oxazolin-5-one; 2-ethenyl-4-methyl-4-nonyl-1,3-oxazolin-5-one; 2-isopropenyl-4-methyl-4-phenyl-1,3-oxazolin-5-one; 2-isopropenyl-4-methyl-4-benzyl-1,3-oxzone-5-one; and 2-ethenyl-4,4-pentamenthylene-1,3-oxazolin-5-one.

19. A water-based pigmented ink as in claim 17 wherein the N-substituted amino acid compound comprises an aspartic ester.

20. A water-based pigmented ink as in claim 19 wherein the aspartic ester comprises a mono- or bis- aspartic ester.

21. A water-based pigmented ink as in claim 17 wherein the amine is selected from the group consisting of polyether, butyl, octyl, dodecyl, phenethyl, and octadecyl amines.

22. A water-based pigmented ink as in claim 17 wherein, subsequent to ring opening, a hydrolysis reaction is carried out.

23. A water-based pigmented ink as in claim 22 wherein the hydrolysis is carried out using sodium hydroxide, lithium hydroxide, potassium hydroxide, or an ammonium hydroxide.

24. A water-based pigmented ink as in claim 17 which further comprises a surfactant.

25. A water-based pigmented ink as in claim 17 which further comprises a alcoholic polyol.

26. A water-based pigmented ink as in claim 25 wherein the alcoholic polyol comprises an ethylene glycol.

27. A water-based pigmented ink as in claim 17 wherein the pigment is selected from the group consisting of black, yellow, magenta, and cyan pigments.

28. A water-based pigmented ink as in claim 27 wherein the black pigment comprises a carbon black pigment.

29. A water-based pigmented ink as in claim 27 wherein the yellow pigment comprises a nickel azo yellow pigment.

30. A water-based pigmented ink as in claim 27 wherein the magenta pigment comprises a quinacridone magenta pigment.

31. A water-based pigmented ink as in claim 27 wherein the cyan pigment comprises a copper phthalocyanine pigment.

32. A water-based pigmented ink as in claim 17 wherein the dispersant comprises:

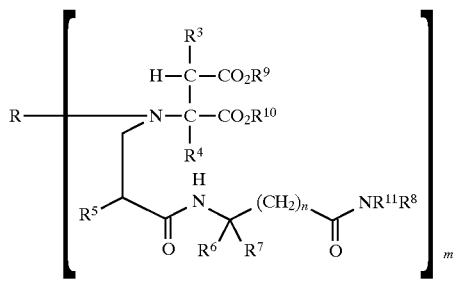

wherein

R is an alkyl, aryl, or aralkyl group;

$R^3$ and $R^4$ are hydrogen or lower alkyl;

$R^5$ is hydrogen or methyl;

$R^6$ and $R^7$ are independently hydrogen, alkyl, or aryl;

$R^8$ is an alkyl group, aryl group, oligomeric or fluorinated alkyl;

$R^9$ and $R^{10}$ are independently alkyl, aryl, or aralkyl, respectively, or a cation;

$R^{11}$ is H or $R^8$ m is 1–6; and n is 0 or 1.

* * * * *